United States Patent [19]
Beretta et al.

[11] 4,307,184
[45] Dec. 22, 1981

[54] PHOTOGRAPHIC ELEMENTS CONTAINING POLYMERS HAVING AMINOALLYLIDENEMALONONITRILE UNITS

[75] Inventors: Paolo Beretta, Ferrania; Angelo Vallarino, Spotorno, both of Italy

[73] Assignee: Minnesota Mining and Manufacturing Company, St. Paul, Minn.

[21] Appl. No.: 189,361

[22] Filed: Sep. 22, 1980

[30] Foreign Application Priority Data

Oct. 12, 1979 [IT] Italy ............................ 50552 A/79

[51] Int. Cl.³ ............................................. G03C 1/84
[52] U.S. Cl. ................................. 430/512; 430/576; 430/627; 430/931
[58] Field of Search ............... 430/512, 931, 576, 627

[56] References Cited

U.S. PATENT DOCUMENTS

| | | | |
|---|---|---|---|
| Re. 30,303 | 1/1980 | Weber et al. | 430/512 |
| 4,045,229 | 8/1977 | Weber et al. | 430/512 |
| 4,106,941 | 8/1978 | Scullard et al. | 430/512 |

Primary Examiner—Jack P. Brammer
Attorney, Agent, or Firm—Cruzan Alexander; Donald M. Sell; Mark A. Litman

[57] ABSTRACT

The present invention refers to a photographic material including in one of its layers a polymeric product having an aminoallylidenemalononitrile ultraviolet absorber unit which can be introduced into a photographic layer by aqueous solutions, with the method according to this invention, of including said aminoallylidenemalononitrile unit in an allyl monomer and then copolymerizing it with an ethylenically unsaturated monomer in order to obtain said polymeric product to be added to the layer forming composition. This invention is of particular industrial interest in the field of color photographic materials.

8 Claims, 3 Drawing Figures

PHOTOGRAPHIC ELEMENTS CONTAINING POLYMERS HAVING AMINOALLYLIDENEMALONONITRILE UNITS

BRIEF DESCRIPTION OF THE INVENTION

The present invention refers to the introduction of ultraviolet absorber compounds in photographic material layers, and particularly of color photographic materials, and to polymeric products particularly useful to this aim. More precisely, this invention refers to copolymers having aminoallylidenemalononitrile units (>N—CH=CH—CH=C(CN)$_2$) as ultraviolet absorbers.

As it is common knowledge, silver halide emulsions are inherently sensitive to blue and ultraviolet radiation, while they are not sensitive to green and red radiations. For normal color photography processes, it is necessary to make these emulsions sensitive to green and red by means of spectral sensitizers (e.g., cyaninic dyes) well known to the skilled in the art.

It is also well known that ultraviolet radiation can harm the chromatic equilibrium of the photographic color images, because they produce a latent image and therefore the formation of color, without any connection to the colors of the image to be reproduced. Such radiation, furthermore, has destructive effects on the materials which form the photographic image when they are exposed to the light after the treatment. (Color paper, for example, after having been exposed and treated, undergoes a color degradation if it does not contain a suitable ultraviolet absorber.)

DETAILED DESCRIPTION OF THE INVENTION

While compounds have been found which are able to protect photographic materials from the destructive effects of UV radiations efficaciously, such as the 2-2'-hydroxyphenylbenzotriazole derivatives described in U.S. Pat. No. 3,004,896, these and other materials do not provide satisfactory results as far as UV absorber compounds to be used in order to have a correct color equilibrium are concerned. As described in Journal Phot. Science, pages 229–40 (1966), these compounds, when introduced in the photographic material, should absorb the ultraviolet radiation near 400 nm and should not absorb those above 420 nm (compounds derived from the above mentioned hydroxyphenilbenzotriazole, absorb between 300 and 370 nm).

Even if some compounds with those absorption characteristics are known, they can lose them when introduced in the layers by the normal techniques known in the art, such as the dispersion technique (which consists, substantially, in dissolving the compound in a substantially non-mixable solvent with water and then in dispersing the so obtained solution in the form of very small droplets in a colloidal hydrophilic binding material, preferably in gelatin). An example of this is represented by compounds derived from aminoallylidenemalononitrile (such as dihexylaminoallylidenemalononitrile) whose preparation is described in Chem. Ber., Vol. 103, pages 222-235 (1970) which have shown to be compounds with a high and sharp absorption near 400 nm (and a high molar extinction coefficient), without absorbing the radiations above 420 nm. Unfortunately they have been shown to lose their characteristics when introduced in the photographic layer according to the above mentioned dispersion method. To obviate this disadvantage the charged polymer technique has been suggested (see Belgium Pat. No. 833,512) which consists in charging solid particles of a particular polymeric latex with an aminoallylidenemalononitrile hydrophobic derivative and in mixing the so-charged latex with the photographic layer gelatin, in which the UV absorber compound must be introduced. This technique, however, has some disadvantages: it is not suitable for obtaining consistent, reproducible results; not every polymeric latex is suitable for this aim, and those that are suitable are of difficult preparation and expensive. Furthermore, the high latex/UV absorber compound ratio makes necessary the use of too high quantities of latex, quantities which negatively affect the physical characteristics of the layer containing it.

The present invention describes a color photographic material including in one of its layers a compound which absorbs ultraviolet radiation near 400 nm and not above 420 nm.

The present invention also describes an ultraviolet absorber compound derived from aminoallylidenemalononitrile which can be introduced in the photographic materials by aqueous solutions in such a way as not to modify its UV absorption properties by the introduction technique. Furthermore, the present invention describes an efficacious method of introducing an aminoallylidenemalononitrile group in the photographic layer without altering its UV absorptions characteristics.

BRIEF DESCRIPTION OF THE DRAWINGS

Some objects have been reached as shown in the enclosed figures.

Figure 1:
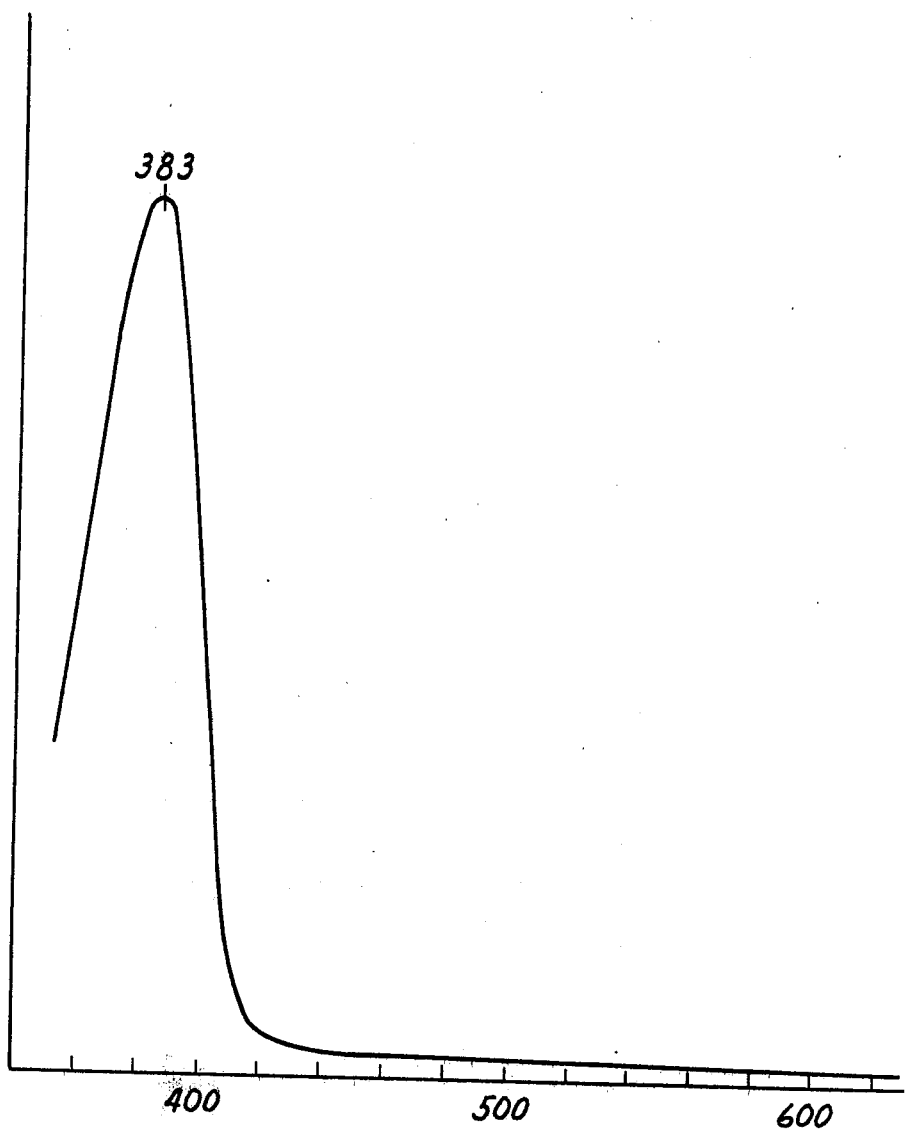
FIG. 1 shows the absorption curve of a gelatin layer having an ultraviolet radiation absorber compound of the present invention, with an aqueous solution added thereto. The layer has an absorption maximum at 383 nm and an absorption lower than 10% of the total for wavelengths higher than 400 nm and shows that the aim of this invention has been reached.
Figure 2:
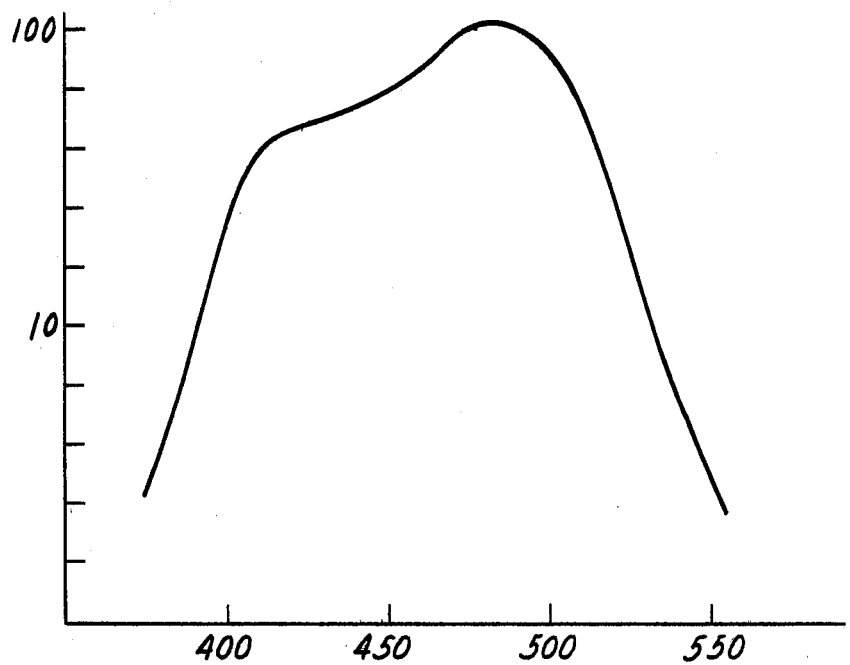
FIG. 2 shows the photographic film specimen spectral sensitivity curve where a sole gelatin protective layer has been spread on a layer of silver halide photographic emulsion which is blue sensitive and FIG. 3 shows the spectral sensitivity of the same blue sensitive photographic material where a gelatin protective layer with an UV absorber according to the present invention (added by an aqueous solution) has been spread on it.
Figure 3:
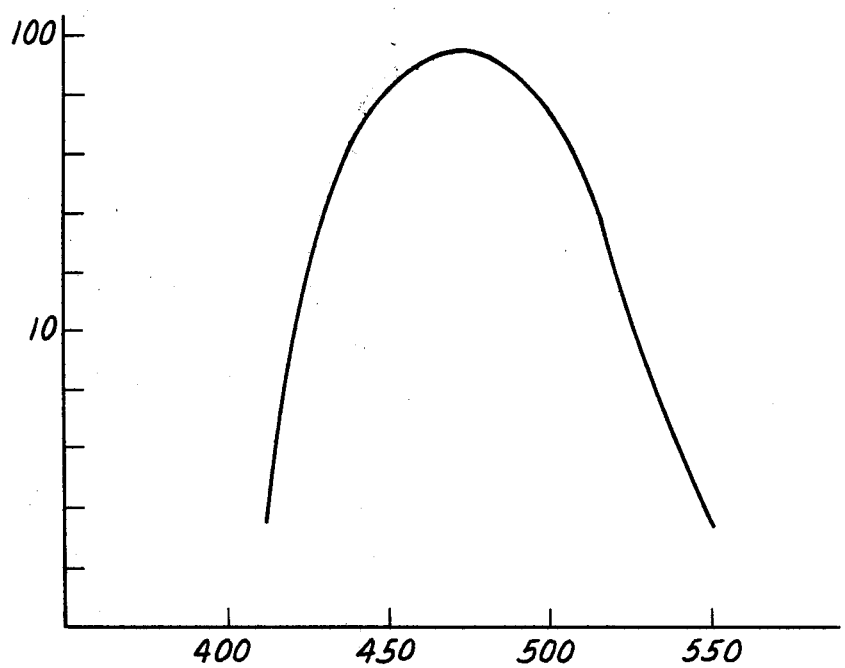

The present invention therefore, refers to a photographic material comprising at least a silver halide layer and, at least, an auxiliary layer spread on a base layer, characterized by the fact that at least one of said layers contains a polymeric product including ultraviolet absorber aminoallylidenemalononitrile units, and said layer preferably being an auxiliary layer, in particular an external protective layer, more preferably these layers being substantially made of gelatin.

In particular, the present invention refers to the above mentioned photographic material in which said silver halide emulsion layer is optically sensitized and is associated with a color forming coupler.

More precisely, the present invention refers to the above mentioned photographic material, in which the ultraviolet absorber aminoallylidenemalononitrile unit is included in 3-aminoallylidenemalononitrile compound, copolymerized with an ethylenically unsaturated monomer, preferably with an acrylic monomer.

According to another aspect, the present invention refers to polymeric products obtained by the copolymerization of a 3-diallylaminoallylidenemalononitrile compound with an ethylenically unsaturated monomer, preferably with an acrylic or methacrylic monomer and more preferably with acrylamide or acrylic acid.

In conclusion the present invention refers to a process to include an ultraviolet absorber aminoallylidenemalononitrile unit in a photographic layer, characterized by including said unit in an allylic monomer first and then copolymerizing it in emulsion or preferably in solution with an ethylenically unsaturated monomer to obtain a polymeric compound that may be introduced directly, or preferably by an acqueous solution, to the layer spreading composition. Preferably, the present invention refers to an above mentioned process, in which the ethylenically unsaturated monomer is an acrylic or methacrylic monomer and more preferably is acrylamide or acrylic acid.

It has been proved, in fact, that it is possible to synthetize an allylic monomer which includes the ultraviolet absorber aminoallylidenemalononitrile unit, making the 3-acetalinilidoallylidenemalononitrile react with diallylamine to provide the 3-diallylaminoallylidenemalononitrile with good yields. Said monomer showed a high capacity to absorb ultraviolet radiation with a high absorption near 400 nm, and a very low absorption above 420 nm in the visible spectral area. It has been proven experimentally that when said compound is added to a photographic layer, dispersed, for example, in the gelatin layer with the help of dispersion solvents (as known to the skilled in the art), the absorption in the ultraviolet is highly reduced while the absorption in the visible spectrum area is augmented. It has been, however, found out that it is possible to copolymerize said 3-diallylaminoallylidenemalononitrile compound (allylic monomer) with an ethylenically unsaturated monomer, to obtain a UV absorbing polymeric compound that may be added directly, or, preferably by an acqueous solution, to photographic layers for the purposes of the present invention.

In case of copolymerization in solution, which is to be preferred to copolymerization in emulsion, it has been found that the acrylic monomers (which are the preferred ones), such as the acrylamides and its N-alkyl-derivatives (such as N-methyl-acrylamide), the methacrylamides and its N-alkyl-derivatives (such as N-methyl-methacrylamide, N-ethyl-methacrylamide, N,N-dimethyl-methacrylamide), the acrylic and methacrylic acids, are particularly suitable to react with said 3-diallylaminoallylidenemalononitrile to obtain copolymers soluble in water which have the desired characteristics. Other suitable monomers (non-acrylic) can be styrene-sulphonic acid, the N-valerolactame, N-vinylpyrrolidone, N-vinyloxazolidone, N-vinylsuccinimide and maleimide. As known to the skilled in the art, the copolymerization can be carried out in one step, making the two monomers react in a suitable solvent with a suitable polymerization initiator and isolating the so obtained copolymer, or, otherwise, adding the ethylenically unsaturated monomer (more reactive than the allylic monomer) and the polymerization initiator to the reaction mass (made of two monomers and the polymerization initiator dissolved in a suitable solvent) at intervals, in such a way as to control the polymer composition (as is generally done in the art when monomers with different reactivity are copolymerized). We have furthermore found that for particular objects it is possible to copolymerize the allylic monomer with more than one ethylenically unsaturated monomer, for example with acrylamide and allylaminochlorhydrate or diallylaminochlorhydrate. The so obtained copolymers can normally have an intrinsic viscosity (in $NaNO_3$ 1 N at 30° C.) of 0.01–0.5 dl/g, preferably of 0.02–0.1 dl/g, being able to choose lower or higher values (e.g., 0.005–1.0) for particular properties and can be added to photographic layers by aqueous solutions.

In case of copolymerization in emulsion, we have found that vinylic esters are suitable monomers. These would include vinylacetate, vinylpropionate, and vinylbutyrate, styrene and, preferably, acrylic or methacrylic acid esters, such as methacrylate, ethylacrylate, 2-ethylhexylacrylate and methacrylic acid corresponding esters. The copolymers provide latices, having ultraviolet absorbing aminoallylidenemalononitrile units, can be added directly to the photographic layer coating compositions, obtaining in this way compatibility with the layer binding, either in a wet state or in a dry state, and a high ultraviolet absorption (however, some problems of turbidity can arise at extremes). Thus, by selecting either the emulsion or solution polymerization techniques, any ethylenically unsaturated monomer may be used.

We have noted an uncertainty in attributing a very definite structural formula to the copolymers of the present invention (the same uncertainty known in literature about the structure of diallylamine derivative polymers, such as it is described in Aust. J. Chem., 29, 315 (1976) and J. Macromol. Sci. Chem., A10, 875 (1976)). The IR and NMR spectra examination have shown a high evidence for an aliphatic carbon atom structure in a pyrrolidine cyclic ring, for diallylaminoallylidenemalononitrile copolymers and acrylic monomer of the present invention, even if the simultaneous presence of a piperidine cyclic ring cannot be excluded. It has been noticed anyway the aminoallylidenemalononitrile units presence, absorbing ultraviolet. They can be present in variable quantity with easily determinable limits for the aims of the present invention. With weight quantities lower than 3%, poorly efficacious UV absorption compounds result, while with a weight quantity higher than 50%, some problems could arise in dissolving the compound in water (used alone or mixed with watermiscible auxiliary solvents, such as methanol, dimethylformamide, ethanol and acetone and/or with addition of other water partly soluble organic solvents, such as benzyl alcohol and phenylcellosolve). Preferred weight quantities are between 5% and 25%.

The ultraviolet absorber compounds of the present invention can be included in any layer of the photographic material, that is either in an emulsion layer, or in an auxiliary layer (e.g., yellow filter layer) or in an external protective layer.

In order to avoid possible interference with the emulsion, owing to the fact that the desired effect is a filtering effect, it is preferred to introduce the present invention copolymers in an external protective layer. Generally those layers are substantially made of gelatin. We have found that the copolymers of the present invention are substantially compatible with gelatin, either in a wet or dry state. From 5 to 100 grams of copolymer can be used, preferably from 25 to 60, for every 100 grams of gelatin.

The present invention is not restricted to photographic elements with a particular type of emulsion or silver halide; therefore it can be used with photographic elements containing different types of emulsions or silver halide, such as those described in Research Disclosure 17643, paragraph I, December 1978.

The employable emulsions can be chemically and optically sensitized as described in Research Disclosure 17643 paragraphs III and IV, December 1978; they can hold optical bleaches, antifog agents and stabilizers, filter and antihalo dyes, hardeners, spreading adjuvants, plasticizers and lubricants and other auxiliaries such as those known in the art and those described in Research Disclosure 17643, paragraphs V, VI, VIII, X, XI and XII, December 1978.

The photographic emulsion layers and the photographic element layers can hold various simple or combined colloids as supporting materials, as described in Research Disclosure 17643, paragraph IX, December 1978.

The employable photographic elements can hold orthochromatic or panchromatic emulsions, such as non-sensitized emulsions. In particular and more preferably, they can be emulsions for color photography holding color forming coupler agents, as described in Research Disclosure 17643, paragraph VII, December 1978.

The above described emulsions can be spread on various supporting bases and with various spreading methods, as described in Research Disclosure 17643, paragraph XV and XVII, December 1978.

In conclusion the photosensitive silver halides held in photographic elements can be treated after the exposure in such a way as to form a visible image according to treatment methods as described in Research Disclosure 17643, paragraph XIX, December 1978.

The invention is now illustrated in the following examples.

SYNTHESIS OF 3-DIALLYLAMINEALLYLIDENEMALONONITRILE INTERMEDIATE (A)

A solution of 97.2 g. (equivalent to 1 mole) of diallylamine and of 237.2 g. (equal to 1 mole) of 3-acetanilidoallylidenemalononitrile in 600 cc. of methanol has been boiled at reflux temperature for 20 minutes. After that, 110 cc. of concentrated hydrochloric acid were added and the mixture was refluxed for 20 minutes. The so obtained mixture was poured into water and ice. The precipitate was airfiltered and the obtained product crystallized from a hydroxymethyl cellulose ether/water mixture 2:1, Yield 63%, M.P. 50°-2° C. A 1:350,000 diluted solution in methylic alcohol gave an optical density of 0.83 at 377 nm with a molar extinction coefficient of $6.3 \times 10^4$. The weight quantities of aminoallylidenemalononitrile units in the copolymers of the following examples were calculated on the ground of the optical density measurements, considering unvaried said molar extinction coefficient after copolymerization).

EXAMPLE 1

Preparation of copolymer (acrylamide-diallylaminoallylidenemalononitrile)

In a 10 liters flask, supplied with stirrer, reflux and internal thermometer, 230 g. of acrylamide and 120 g. of 3-diallylaminoallylidenemalononitrile (A) were dissolved in 4 liters of ethanol at 96%. The mixture temperature was increased to 78° C. under agitation. 8 g. of 2,2'-azobisisobutyrronitrile (AZBN) were introducted at this point. After 10 minutes, a yellowish product began separating. The reaction was continued under those conditions for 14 hours. The mixture was then cooled at room temperature; the separated product was filtered, washed with diethyl ether and vacuum dried at 50° C. The yield of the solid yellowish product was 320 g., with 8% aminoallylidenemalononitrile units in weight. The IR, spectrophotometric analysis and the TLC confirmed for the polymer a structure with allylidenemalononitrile groups. The solution at 6% in 70/30 water/ethanol diluted 1:2000 in water showed an optical density of 0.7 at 382 nm.

EXAMPLE 2

Preparation of copolymer (acrylamide-allylaminoallylidenemalononitrile)

A solution of 120 g. of acrylamide and 114 g. of 3-diallylaminoallylidenemalononitrile (A) in 500 cc. of ethanol was refluxed. 3.2 g. of AZBN were added and the solution was refluxed for one hour under stirring. A solution of 104 g. of acrylamide, 800 cc. of ethanol and 3.2 g. of AZBN was added and the solution was refluxed for one hour under stirring. A solution of 88 g. of acrylamide, 400 cc. of ethanol and 2.4 g. of AZBN was added and refluxed for one hour. A solution of 72 g. of acrylamide, 400 cc. of ethanol and 1.6 g. of AZBN was added and the solution was refluxed for one hour. In conclusion a solution of 56 g. of acrylamide, 400 cc. of ethanol and 1.6 g. of AZBN was added and refluxed for 2 hours. The mixture was cooled, filtered, washed with ethanol and then with ethyl ether and vacuum dried at 50° C. 478 g. of a product containing about 9% aminoallylidenemalononitrile units in weight were obtained, the product solution at 6% in water diluted 1:2000 with water had an optical density of 0.76 at 382 nm.

EXAMPLE 3

Preparation of copolymer (acrylamide-diallylaminoallylidenemalononitrile)

A solution of 40 g. of acrylamide, 52 g. of 3-diallylaminoallylidenemalononitrile (A) in 900 cc. of ethanol was refluxed. 1.3 g. of AZBN was added and the solution refluxed for two hours. At two hour time intervals, the following solutions were added in this order by refluxing:

|  | (a) | (b) | (c) | (d) |
|---|---|---|---|---|
| acrylamide g. | 32 | 32 | 28 | 24 |
| ethanol cc. | 200 | 200 | 150 | 150 |
| AZBN g. | 1 | 1 | 0.8 | 0.8 |

After the last addition the mixture was refluxed for three hours. It was cooled, filtered, washed with ether and vacuum-dried at 50° C. The yield was 185 g. of a product containing about 10% of aminoallylidenemalononitrile in weight, product whose solution at 6% in 70/30 water/ethanol, diluted at 1:2000 with water, had an optical density of 0.80 at 382 nm.

EXAMPLE 4

Preparation of copolymer
(acrylamide-diallilaminoallylidenemalononitrile)

A solution of 26 g. of acrylamide, 52 g. of 3-diallylaminoallylidenemalononitrile (A) in 900 cc. of ethanol was refluxed. 1 g. of AZBN were added and refluxed for one hour. At one hour time intervals the solutions from (a) to (f) were added, always by refluxing, in this order:

|  | (a) | (b) | (c) | (d) | (e) | (f) |
|---|---|---|---|---|---|---|
| Acrylamide g. | 24 | 22 | 20 | 18 | 16 | 14 |
| Ethanol cc. | 100 | 100 | 1000 | 100 | 75 | 70 |
| AZBN g. | 0.2 | 0.18 | 0.16 | 0.16 | 0.16 | 0.16 |

After that it was cooled, filtered, washed with ethyl ether and vacuum-dried at 50° C. The yield was 128 g. of a product containing about 9% of aminoallylidenemalononitrile units in weight. The product, whose solution at 6% in water was diluted at 1:3000 with water, had an optical density of 0.50 at 382 nm and an intrinsic viscosity $\eta = 0.21$ dl/g in $NaNO_3$ 1 N at 30° C.

EXAMPLE 6

Preparation of the copolymer (acrylic acid - allylaminoallylidenemalononitrile)

A solution of 60 g. = 56 cc. of acrylic acid and 60 g. of 3-diallylaminoallylidenemalononitrile (A) in 250 cc. of ethanol was refluxed. 6 g. of AZBN were added and it was reflux-washed for 18 hours. It was cooled, saturated with ether and precipitated in ether, washed with ether and vacuum dried at 50° C. The yield was 92 g. of a product containing about 27% of aminoallylidenemalononitrile units in weight, whose solution at 6% in water and NaOH at pH7 was diluted at 1:8000 with water had an optical density of 0.60 at 382 nm. All subsequent optical density readings are given at this wavelength unless otherwise stated.

EXAMPLE 7

Preparation of the copolymer (acrylic acid - allylaminoallylidenemalononitrile)

A solution of 20 g. of acrylic acid and 60 g. of 3-diallylidenemalononitrile (A) in 120 cc. of ethanol was refluxed. 2 g. of AZBN were added and let reflux for one hour. At one hour time intervals, always be refluxing, the following solutions were added in this order:

|  | (a) | (b) | (c) | (d) |
|---|---|---|---|---|
| Acrylic acid g. | 16 | 13 | 10 | 8 |
| ethanol cc. | 20 | 20 | 15 | 15 |
| AZBN g. | 1 | 1 | 0.8 | 0.8 |

After that it was let reflux for two hours, then cooled, saturated with chloroform and precipitated in chloroform, filtered and washed with chloroform; vacuum dried at 50° C. The yield was 109 g. of a product containing about 30% of aminoallylidenemalononitrile units in weight, whose solution at 6% in water and NaOH at pH7 diluted at 1:10000 with water, had an optical density of 0.52 at 383 nm.

EXAMPLE 8

Preparation of copolymer
(ethylacrylate-allylaminoallylidenemalononitrile)

A solution of 540 g. of ethyl acrylate and 48 g. of intermediate (A) in 60 cc. of ethanol was prepared. 120 g. of this solution were added to a solution of 24 g. of sodium lauroyl sulphate in 1,200 cc. of water at 40° C. in a flask with stirrer and reflux and then 1 g. of potassium persulphate was added to the obtained mixture. The mixture internal temperature was increased to 85°-90° C. under stirring, when the mixture began boiling the remaining cc. of the solution containing ethylacrylate were added drop by drop; when the addition had been done, the mixture was left at 75° C. taking the reflux out of the flask until the smell of ethyl acrylate disappeared and finally the obtained latex volume was brought to 2000 cc. A sample of the latex was dried obtaining a dry percentage of 12.6 and a nitrogen percentage of 3.71 equivalent to 15% of units derived from intermediate (A). The latex was diluted until a 10% dry was obtained; 1 cc. of this latex diluted at 5000 cc. with water, had an optical density of 0.82 at 383 nm.

EXAMPLE 9

Preparation of the copolymer
(acrylamide-diallylaminoallylidenemalononoitrile)

52 g. of intermediate (A) and 26 g. of acrylamide were dissolved in 900 cc. of ethanol and 1 g. of lauroyl peroxide was added and the mixture was reflux heated in a flask with stirrer and reflux; after one hour, 24 g. of acrylamide in 100 cc. of ethanol and 0.8 g. of lauroyl peroxide were added; always continuing the reflux warming, at one hour time intervals the following additions were made: 22 g. of acrylamide in 100 cc. of ethanol and 0.7 g. of lauroyl peroxide; 20 g. of acrylamide and 0.7 g. of lauroyl peroxide in 100 cc. of ethanol; 18 g. of acrylamide and 0.7 g. of lauroyl peroxide in 100 cc. of ethanol; 16 g. of acrylamide and 0.7 g. of lauroyl peroxide in 75 cc. of ethanol; 14 g. of acrylamide and 0.7 g. of lauroyl peroxide in 75 cc. of ethanol. After the last addition, the mixture was refluxed for two hours then it was cooled at room temperature, filtered, washed with ethanol first and then with acetone, and at the end dried. The yield was 112 g. of a product containing about 10.5% of aminoallylidenemalononitrile units. A solution at 6% of the 70:30 water/ethanol diluted product, diluted at 1:3000 with water, had an optical density of 0.55.

EXAMPLE 10

Preparation of copolymer (acrylic acid-diallylaminoallylidenemalononitrile)

60 g. of intermediate (A) and 20 g. of acrylic acid were diluted in 120 cc. of ethanol in a flask with stirrer and reflux and 2 g. of lauroyl peroxide were added, and then reflux heated. After one hour, 16 g. of acrylic acid and 1 g. of lauroyl peroxide diluted in 20 g. of ethanol were added; always continuing the reflux heating, at one hour time intervals the following additions were made: 13 g. of acrylic acid and 1 g. of lauroyl peroxide in 20 cc. of ethanol; 10 g. of acrylic acid and 0.8 g. of lauroyl peroxide in 15 cc. of ethanol; 8 g. of acrylic acid and 0.8 g. of lauroyl peroxide in 10 cc. of ethanol. After the last addition the mixture was refluxed for two hours, then it was cooled, and precipitated in ethyl ether; the precipitate was recovered on filter, washed with ether and vacuum dried at 50° C. The yield was 49 g. of a product containing about 23% of aminoallylidenemalononitrile units. The product was water and NaOH at pH=7 soluble. A solution at 6% 1:9000 diluted with water, had an optical density of 0.46.

EXAMPLE 11

Preparation of the copolymer (acrylamidediallylaminoallylidenemalononitrile)

50 g. of intermediate (A) and 2 g. of acrylamide, diluted in 100 cc. of ethanol and added with 0.5 g. of azobisisobutyrronitrile, were reflux heated in a flask with stirrer and reflux. Every 30 minutes, always maintaining the reflux heating, 2 g. of acrylamide diluted in 10 cc. of ethanol were added for a total of 12 additions. No. 6 addition held 0.5 g. of AZBN too. The mixture was cooled, the separated product was recovered and washed with ether well, it was vacuum dried at 50° C. The yield was 32 g. of a 50:50 water/acetone soluble product holding about 44% of aminoallylidenemalononitrile units by weight. A solution at 6%, 1:10000 diluted with water, had an optical density of 0.74.

EXAMPLE 12

Preparation of the copolymer (N-vinyl-pyrrolidonediallylaminoallylidenemalononitrile)

25 g. of intermediate (A) and 25 g. of vinylpyrrolidone were diluted in 100 cc. of N-methylpyrrolidone and 2.5 g. of AZBN were added; the mixture was then heated at 85° C. for 6 hours in a flask with stirrer and reflux. The mixture was cooled, precipitated with ether, the precipitate was washed with ether, dried at 50° C. The yield was 15.7 g. of a product 40:60 water/ethanol soluble containing about 44% aminoallylidenemalononitrile units by weight. A solution at 6%, 1:10000 diluted with water, had an optical density of 0.74.

EXAMPLE 13

Preparation of the copolymer (N-vinyl-oxazolidonediallylaminoallylidenemalononitrile)

25 g. of intermediate (A) and 25 g. of vinyloxazolidone were diluted in 150 cc. of ethanol and 2.5 of AZBN were added. Then the mixture was reflux heated for 24 hours in a flask with stirrer and reflux. It was then cooled, precipitated in ether, washed and dried. The yield was 14.5 g. of a product soluble in DMF, containing about 45% by weight aminoallylidenemalononitrile units. A solution at 6% in DMF, 1:10000 diluted with water, had an optical density of 0.78.

EXAMPLE 14

Preparation of copolymer (vinyloxazolidonediallylaminoallylidenemalononitrile)

25 g. of the intermediate (A) and 50 g. of vinyloxazolidone were diluted in 150 cc. of N-methylpyrrolidone and 3.75 g. of AZBN were added. Then they were heated at 85° C. for 24 hours in a flask with stirrer and reflux. The mixture was cooled, precipitated in ethyl ether (2 liters) washed with ether and dried. It was dissolved again in DMF and precipitated again in ethyl ether. The yield was 32.7 g. of a product soluble in DMF, containing about 37% by weight aminoallylidenemalononitrile units. A solution of 6% in DMF, diluted at 1:10000 with water, had an optical density of 0.64.

EXAMPLE 15

Preparation of terpolymer (3-diallylaminoallylidenemalononitrile-acrylamide-allylaminechlorhydrate)

In a flask with stirrer and reflux, 40 g. of the intermediate (A), and 10.6 g. of allylamine in 580 cc. of ethanol and 19.6 cc. of hydrochloric acid at 37% are dissolved. A solution of 107.7 g. acrylamide is added to 4.2 g. of 2,2'-azobisisobutyrronitrile in 648 cc. of ethanol, under agitation and bringing the mixture to 90° C. The reaction mixture was kept at 90° C. for 20 hours, and then poured in 2 lt. of acetone; the precipitated product was milled and washed by decantation with 1 lt. of acetone, filtered and dried. The yield was 108.6 g. of a product containing about 10% by weight aminoallylidenemalononitrile units. A solution at 6% in water, diluted at 1:2000 with water had an optical density of 0.81.

EXAMPLE 16

Preparation of terpolymer (3-diallylaminoallylidenmalononitrile-acrylamide-diallylaminechlohydrate)

In a flask with stirrer and reflux, 34.6 g. of intermediate (A) and 9.2 g. of diallylamine are dissolved in 500 cc. of ethanol and 9.5 cc. of hydrochloric acid at 37%. Under agitation and raising the temperature to 90° C., 93.2 g. of acrylamide and 3.6 g. of 2,2'-azobisisobutyrronitrile were added in 500 cc. of ethanol. The reaction mixture was kept at 90° C. for 20 hours then poured in 2 lt. of acetone; the precipitated product was milled and washed with acetone by decantation, filtered and dried. The yield was 109 g. of a product containing about 7% by weight of aminoallylidenemalononitrile units whose solution at 6% in water, diluted with 2000 cc. with water, had an optical density of 0.65.

EXAMPLE 17

The polymeric compound mentioned in example No. 1 was dissolved in 70/30 water/ethanol mixture, with a 6% concentration and the solution was poured in a gelatin solution at 8%; the composition was spread on a cellulose triacetate supporting base; the obtained layer absorption curve (annexed FIG. 1) shows a maximum absorption at 383 nm (similar to that of the compound solution of example No. 1) and an absorption lower than 10% of the total for wavelength higher than 400 nm.

EXAMPLE 18

Five color reversal films, made of a supporting base and, in this order, two red sensitive layers, an intermediate layer, two green sensitive layers, a yellow layer and a blue sensitive layer. On the external blue sensitive layer of each film different protective layers were spread, that is: a layer containing 2.6 g/m² of sole gelatin (test No. 1), a layer containing 2.6g/m² of gelatin and 1.94 g/m² of the example No. 1 compound (test No. 2), a layer containing 2.6 g/m² of gelatin and 1.63 g/m² of the example No. 3 compound, in water/ethanol solution at 6% (test No. 3), a layer containing 2.6 g/m² of gelatin and 1.05 g/m² of the example No. 4 compound, in 70/30 water/ethanol solution (test No. 4) and lastly a layer containing 2.6 g/m² of gelatin and 0.71 g/m² of the example No. 10 compound. A sample of each spreading was exposed in a sensitometer and a spectrograph using a tungsten lamp and developed in a standard treatment for reversal color. The spectral sensitivity curves of the blue sensitive layers are shown in the annexed figures No. 2 (test No. 1) and No. 3 (test Nos. 2, 3, 4, and 5).

EXAMPLE 19

Three photographic films for color negative with high sensitivity made of a supporting base, two red sensitive layers, an intermediate layer, two green sensitive layers, a yellow filter layer and two blue sensitive layers, were prepared. On the external blue sensitive layer of each film different protective layers were spread: a layer containing 1.39 g/m² of gelatin (test No. 1), a layer containing 1.39 g/m² of gelatin and 0.8 g/m² of the example No. 2 copolymer (test No. 2) and layer containing 1.39 g/m² of gelatin and 0.8 g/m² of the example No. 8 copolymer (test No. 3). A sample of each film was exposed in a sensitometer and a spectrograph using a tungsten lamp and developed in a standard treatment for color negative. The spectral sensitivity curves showed that tests Nos. 2 and 3 containing the polymeric compounds of the present invention absorb ultraviolet light sufficiently, while the same ultraviolet light contributes to the film exposure described in test No. 1, which is undesirable for a good color reproduction.

We claim:

1. A photographic material comprising at least one silver halide emulsion layer and at least one auxiliary layer on a supporting base, characterized by having at least one of said layers containing a polymer having an ultraviolet radiation absorbing aminoallylidenemalononitrile group.

2. A photographic material according to claim (1), in which said auxiliary layer contains said polymer.

3. A photographic material according to claim (1), wherein said auxiliary layer is an external protective layer.

4. A photographic material according to claim (1), wherein said emulsion layer and said auxiliary layer are comprised of gelatin.

5. A photographic material according to claim (1), wherein said silver halide emulsion layer is optically sensitized.

6. A photographic material according to claim (1), wherein said silver halide emulsion layer has photographic couplers therein.

7. A photographic material according to claim (1), wherein said ultraviolet absorber aminoallylidenemalonoitrile group is included in a polymeric compound, which is the reaction product of 3-diallylaminoallylidenemalononitrile and an ethylenically unsaturated monomer.

8. A photographic material according to claim (1), wherein said ultraviolet absorber aminoallylidenemalononitrile group is included in a polymeric compound which is the reaction product of 3-diallylaminoallylidenemalononitrile and an acrylic monomer.

* * * * *